(12) United States Patent
Plummer et al.

(10) Patent No.: US 8,682,702 B1
(45) Date of Patent: Mar. 25, 2014

(54) CUSTOMER SATISFACTION DASHBOARD

(71) Applicant: State Farm Mutual Automobile Insurance Company, Bloomington, IL (US)

(72) Inventors: Sherry Plummer, Bloomington, IL (US); Doug Sholtis, Hudson, IL (US); Tom Flynn, Bloomington, IL (US); Les Meyer, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/908,368

(22) Filed: Jun. 3, 2013

Related U.S. Application Data

(63) Continuation of application No. 13/646,803, filed on Oct. 8, 2012, now Pat. No. 8,478,621.

(51) Int. Cl.
*G06Q 40/00* (2012.01)

(52) U.S. Cl.
USPC .......................................... 705/7.11; 705/7.42

(58) Field of Classification Search
USPC ............................................... 705/7.11, 7.42
See application file for complete search history.

(56) References Cited

U.S. PATENT DOCUMENTS

| | | |
|---|---|---|
| 7,577,246 B2 | 8/2009 | Idan et al. |
| 8,103,531 B2 | 1/2012 | Wollan et al. |
| 8,478,621 B1 | 7/2013 | Plummer et al. |
| 2002/0133392 A1 | 9/2002 | Angel et al. |
| 2003/0130877 A1 | 7/2003 | Farnes et al. |
| 2007/0239515 A1 | 10/2007 | Hernandez et al. |
| 2010/0138282 A1 | 6/2010 | Kannan et al. |
| 2011/0238477 A1 | 9/2011 | Urbanski |
| 2011/0251871 A1 | 10/2011 | Wilson Rogers et al. |
| 2012/0271687 A1 | 10/2012 | Urbanski |

*Primary Examiner* — Thomas Dixon
*Assistant Examiner* — Benjamin S Fields
(74) *Attorney, Agent, or Firm* — Marshall, Gerstein & Borun LLP; Randall G. Rueth

(57) ABSTRACT

An instrument for measuring and presenting customer impressions of a company uses weighted response values of survey questions to develop a customer experience score and a customer interaction score. The two scores are added to produce a composite score. The three scores for a company may be presented with other score sets for other companies to provide a simple and consistent comparison of companies. When different businesses or even different industries have different customer experiences and interactions, weighting of response values can be adjusted to more accurately reflect the importance of that factor on the overall customer experience, which models customer satisfaction.

21 Claims, 4 Drawing Sheets

CUSTOMER SATISFACTION DASHBOARD

CROSS-REFERENCE TO RELATED APPLICATIONS

This application is a continuation of U.S. patent application Ser. No. 13/646,803, filed Oct. 8, 2013, the disclosure of which is hereby expressly incorporated herein by reference.

TECHNICAL FIELD

This disclosure is directed to a system and method for compiling, weighting, and displaying a compilation of consumer business metrics, specifically, customer experience metrics.

BACKGROUND

This Background is intended to provide the basic context of this patent application and it is not intended to describe a specific problem to be solved.

Measuring customer satisfaction in a business presents a number of challenges, including selection of what areas to query, what level of subjectivity to request of survey-participants, and selecting a weighting criteria that reflects the business impact of a particular topic. In a large business, where many business units contribute to the company's success, these customer satisfaction measures may vary by business unit, further complicating the task of properly evaluating customer experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In order to consistently evaluate consumer impressions of a product or service in an industry, even across widely disparate business lines, an evaluation tool recognizes several fundamental topics that affect consumer impressions and builds business-specific factors to measure each topic for that business. Further, recognizing that some factors are more important to certain businesses than others, each factor may be weighted for a particular business and topic.

For almost any industry, these topics may include price, brand reputation, reliability, and responsiveness/customer service. In an insurance industry, these topics may include a customer's view of getting personalized products or services, their claims activity, and whether the company cares about them as an individual. However, the impact of these factors for products such as car insurance vs. life insurance may vary based on the number of interactions, price competition, and the difference in claims activity. Developing different questions for each topic by business lines allow for the collection of metrics for a common topic, e.g., reliability, that reflects that particular business's marketplace. Applying different weights when calculating scores provides a mechanism to adjust for the relative impact of that topic to customers in a particular business or industry.

In one embodiment, a method of developing scores from customer experience data comprises receiving, at a server, information related to: i) a customer's experience with a company, the information including data associated with the customer's perception of two or more experience categories, and ii) the customer's specific interactions with the company, the information including data associated with interactions between the consumer and the company for two or more interaction categories. The method further comprises using a first algorithm executed on the server to weight the customer experience data to develop an experience score for the company, using a second algorithm executed on the server to weight the customer specific interaction data to develop an interaction score for the company, and using a third algorithm executed on the server to develop a composite score for the company. Still further, the method comprises rendering an image of at least one of the experience score, the interaction score, or the composite score for the company for presentation of the image via a computer.

DETAILED DESCRIPTION OF THE INVENTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term _____ is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
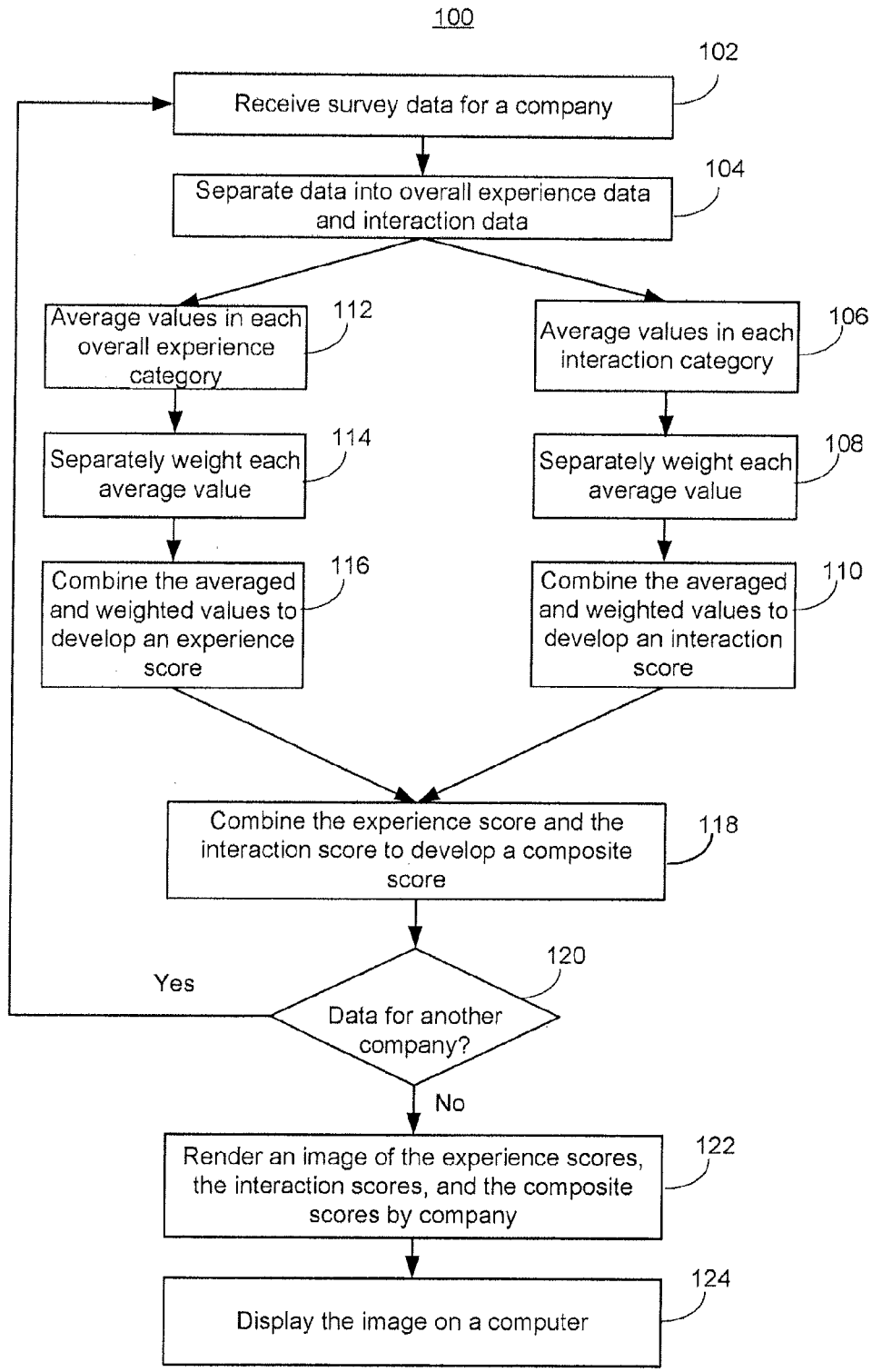
FIG. 1 is a flow chart illustrating compilation and presentation of an exemplary customer satisfaction dashboard.

FIG. 1 is a flowchart of a method, routine, or process 100 for compilation and presentation of a customer satisfaction dashboard. The method 100 may be performed on one or more computers, such as the computer system illustrated in FIG. 3. A system may receive survey data for a particular company (block 102). The survey data may be the result of telephone surveys performed by an outside agency, live interviews for example, at a mall, surveys administered by a company's internal personal or administered via a web session.

The data is most commonly in the form of responses to questions, where each question contributes to understanding the customer or consumer's perspective on a particular topic. Exemplary questions may be targeted to areas such as price, responsiveness, brand reputation, etc.

While the survey data may include customers of a particular company, that is, persons purchasing a product or service from a company (e.g., an insurance or financial service company), that is not always the case. For example, in an automobile insurance business, a victim of a car accident may interact with an insurance company other than her own during the course of getting her car repaired. For the purpose of this description, the terms customer and consumer are interchangeable and are assumed to include these 'casual' or one-time business relationships.

After the survey results for a particular company are received, the results data may be broadly separated into two or more general areas. In an embodiment, the broad subject areas may be an experience area and an interaction area, with each area intended to reflect different aspects of a customer's impressions of the company.

In one embodiment, categories in the experience area may include price, responsiveness, reliability, availability, brand reputation, simple to do business with, caring, and personalized. The last three categories, simple to do business with, caring, and personalized, represent more or less subjective personal feelings about the customer's experience and may, in some cases, be combined separately into a single factor before being consolidated with the other experience data.

In the exemplary embodiment, the interaction area may include categories reflecting specific instances when the customer interacted with the company, and may include purchase, quote, policy change, billing/payment, and claims activity.

Each category may have several contributing factors to which questions may be directed during the survey process. In the experience area, each category may gather data based on the customer's impressions of following characteristics.

Price: Price compared to others, Satisfaction with price
Responsiveness: Responsive to questions or concerns
Reliability: Provides quality service, Follows through
Brand: Likelihood to be a customer in a year, Likelihood to recommend, Trustworthy, Good reputation as an auto insurer
Expertise: Ability to answer any question consumer may have
Accuracy: Does things right the first time, Provides accurate information
Availability: Conduct business how I want, Conduct business when I want A special factor is separately calculated and has the categories:

Simple: Easy to do business with, Easy to understand explanations
Caring: Listens to me and my concerns, Values and appreciates my business, Treats me with respect, Sees me as a person—not a number
Personalized: Knows me as a customer, Provides personalized service, Knows how to best communicate with me, Provides coverage to meet my needs The interaction categories may have similar characteristics, but are generally more self explanatory. Typically, responses for both the experiences categories and the interaction categories are rated on a numerical scale, e.g., 1-5. The collected responses for a company, which may involve many thousands of surveys, may be averaged for each factor in its respective category, interaction (block 106) and experience (block 112). For example, 750 individual values for responsiveness may be averaged and given a 3.9 rating. Categories where more than one question may provide additional factor data, such as the two contributors to the price category in the exemplary embodiment above, may be averaged together. However, in other embodiments, they may be averaged separately and weighted before being combined into a single value for price. Weighting is discussed in more detail below.

When each interaction category has a value calculated, the interaction category values may be weighted to reflect each category's relative impact on customer satisfaction (block 106). In an exemplary embodiment, the interaction categories may be equally weighted, that is, all five categories are given equal weight. The interaction category values may be combined to develop an interaction score (block 110).

Similarly, when each experience category has a value calculated, the categories may be weighted (block 114). In an exemplary embodiment, the experience categories may be equally weighted. However, in another embodiment, the experience categories may be separately weighted to reflect each category's contribution to a customer's perception of the company.

One of many possible weightings of these categories applies weights as follows:

Price in a range of 0.15 to 0.25 (15%-25%);
Responsiveness in a range of 0.10 to 0.20 (10%-20%);
Reliability in a range of 0.10 to 0.20 (10%-20%);
Availability in a range of 0.05 to 0.15 (5%-15%);
Brand in a range of 0.05 to 0.15 (5%-15%);
Expertise in a range of 0.05 to 0.15 (5%-15%);
Accuracy in a range of 0.05 to 0.15 (5%-15%); and
Special factor in a range of 0.05 to 0.15 (5%-15%).

When calculating the special factor, its component categories may first be weighted where:

Simple-to-do-business-with in a range of 0.4 to 0.6 (40%-60%);
Caring in a range of 0.15 to 0.35 (15%-35%); and
Personalized in a range of 0.15 to 0.35 (15%-35%).

When selecting range values, the sum of the percentages should equal 100%, although that is not strictly necessary, as long as the weighting is done consistently across all companies that are to be compared. In practice, whether the data for each category is weighted first and then averaged or averaged first and then weighted is simply a design choice.

When the experience categories have been weighted, the weighted values may be combined to develop an experience score (block 116). In an embodiment, the interaction score and the experience scores may be a simple sum of the weighted category values. In other embodiments, the scores may be averages. However, by summing the category values, the scale is spread so that differences between companies can be noted without the use of multiple decimal places in the numerical scores and so is simply a convenience to make comparison easier.

To develop a composite score for a company, the experience score and the interaction score may be combined (block 118). Similar to above discussion, the composite score may be an average of the experience scores and the interaction scores. In other embodiments the composite score may be a simple sum of the two, or the composite score may be the result of a weighted combination of the two.

If there is data for another company (block 120), the process returns via the 'yes' branch from block 120 and repeats for each company for which there is data. If there is no data for any other company, the 'no' branch from block 120 is followed.

The experience scores, the interaction scores, and the composite scores, by company, may be rendered into a graphical form suitable for presentation (block 122), for example, via a web browser. In an embodiment, the composite score for each company is separately shown in a shape including a company identifier. The experience score and the interaction score may be illustrated in separate shapes with a connector to the composite score. When scores for a plurality of companies is available, a final metric may be developed as the average of experience scores, interaction scores, and composite scores to reflect an industry or segment average. A single image with all companies and industry scores may be rendered or each company may be rendered separately.

Figure 2:
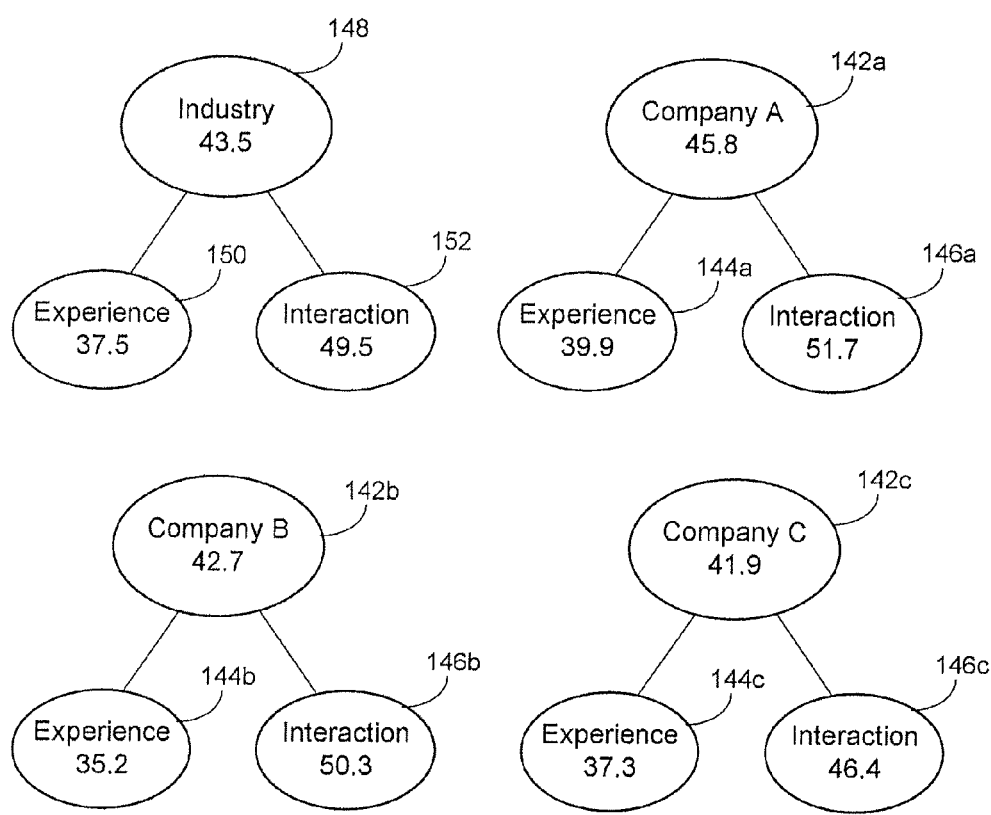
FIG. 2 is a rendering of an exemplary customer satisfaction dashboard.

When requested, the rendered image or images may be displayed via a computer (i.e., a server, a laptop computer, an iPad or other tablet, a smart phone or any other computing device) (block 124). See, e.g., FIG. 2. FIG. 2 illustrates an image rendered for display, for example, at block 122 showing an exemplary customer satisfaction dashboard 140. The customer satisfaction dashboard 140 may include company-specific composite scores 142a, 142b, and 142c. Each company-specific composite score may be illustrated with its respective component scores, in this example, experience scores 144a, 144b, 144c and interaction scores 146a, 146b, 146c. Also illustrated in FIG. 2 is an industry composite score 148 and its component experience score 150 and interaction score 152. As illustrated in this example, the industry score is the average of the scores for the other three companies, although more or less than three companies may be represented in some industries or business segments. The customer satisfaction dashboard 140 provides a single-look comparison between companies and a summary breakdown of the major factors contributing to the company and overall scores. When used over time, the dashboard 140 provides a mechanism to track changes in customer sentiment and to evaluate the impact of customer-facing programs, such as advertising.

Figure 3:
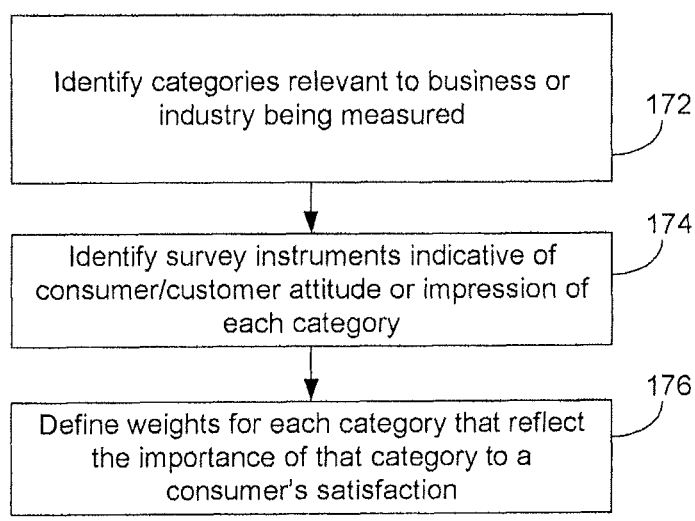
FIG. 3 is a flow chart illustrating a process for developing a customer satisfaction dashboard.

FIG. 3 is a flow chart illustrating a method, routine, or process 170 for developing a customer satisfaction dashboard, such as customer satisfaction dashboard 140 of FIG. 2. The process 170 may involve identifying categories relevant to a business or industry that is to be measured (block 172). The consumer or customer attitudes or impressions may be identified or developed based on the responses to the various survey instruments (block 174). For example, to determine a consumers impression of a company's responsiveness, a series of questions may be developed such as, the company:
 responds to questions and requests quickly.
 follows through on what they say they will do.
 is committed to serving customers' needs.
 follows through on promises made to customers.
 completes tasks successfully.

The development of this kind of instrument is a science of its own and is beyond the scope of the current disclosure. When the categories are defined, additional studies may be performed that evaluate how a particular category contributes to the customer's overall view of the company. Based on those studies, weighting factors for each category may be developed (block 176). These weighting factors may be applied during the generation of the customer satisfaction dashboard, as discussed above.

Figure 4:
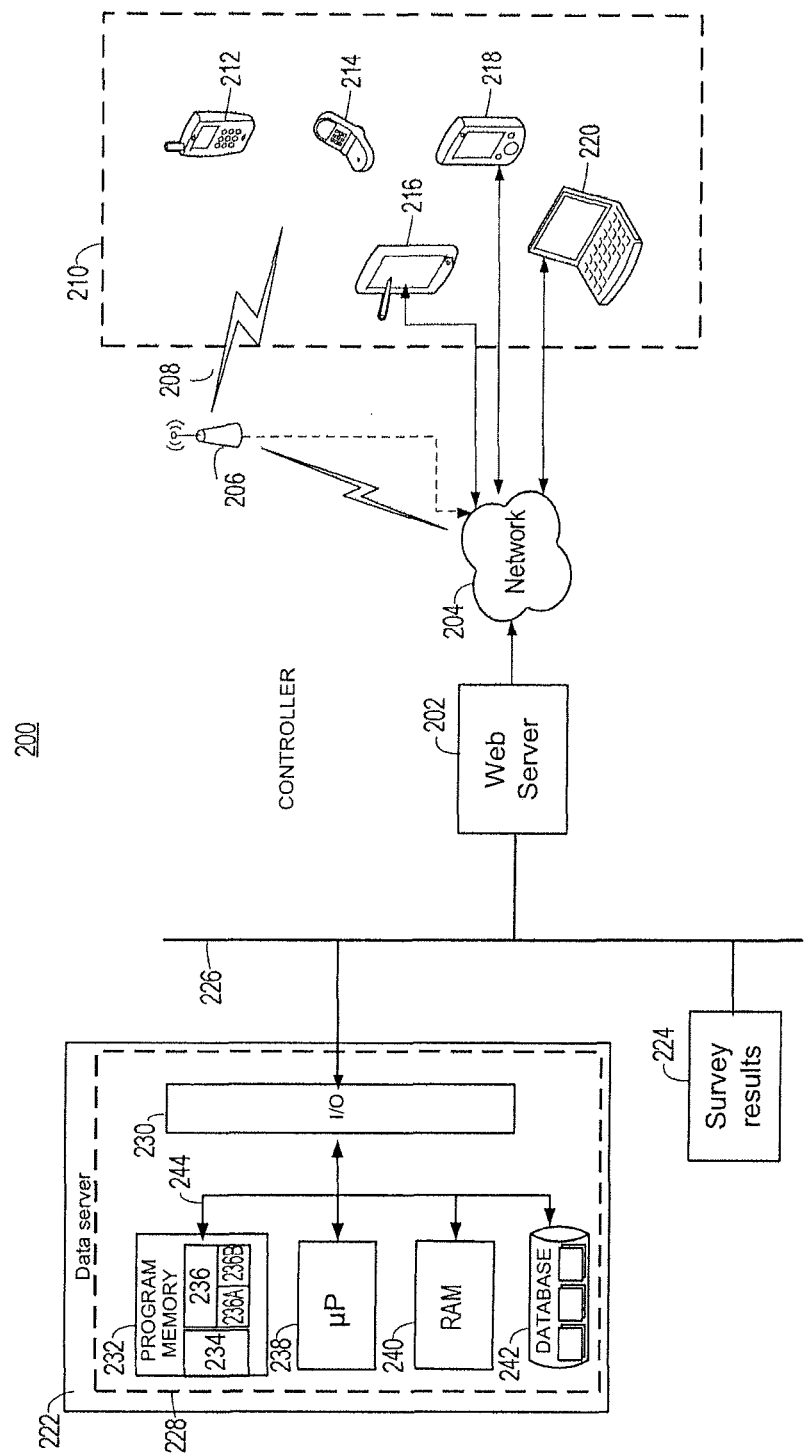
FIG. 4 is a simplified and exemplary block diagram of a system supporting processing and display of a customer satisfaction dashboard.

FIG. 4 illustrates various aspects of an exemplary architecture 200 implementing a customer satisfaction dashboard. The high-level architecture includes both hardware and software applications, as well as various data communications channels for communicating data between the various hardware and software components. In an embodiment, survey results 224 may be received from a third party survey company or an internal department responsible for customer and consumer research. The survey results storage 224 may be a part of a data server 222 or may be a separate server with independent memory.

In another embodiment, survey results may be received from a number of web-enabled devices 210 via a web server 202 connected over a network 204. These devices may include by way of example, a smart-phone 212, a web-enabled cell phone 214, a tablet computer 216, a personal digital assistant (PDA) 218, or a laptop/desktop computer 220. In some instances, the web enabled devices 210 may communicate with the network 204 via wireless signals 208 and, in some instances, may communicate with the network 204 via an intervening wireless or wired device 206, which may be a wireless router, a wireless repeater, a base transceiver station of a mobile telephony provider, etc. In most cases, the network 204 may be the Internet, using an Internet Protocol, but other networks may also be used.

The web server 202 may be implemented in one of several known configurations via one or more servers configured to process web-based traffic received via the network 204 and may include load balancing, edge caching, proxy services, authentication services, etc.

The data server 222 may be connected to the web server 202 via a network 226 and may implement the processes described above for compiling, weighting, and displaying the customer satisfaction dashboard.

The data server 222 includes a controller 228. The controller 228 includes a program memory 232, a microcontroller or a microprocessor (pP) 238, a random-access memory (RAM) 240, and an input/output (I/O) circuit 230, all of which are interconnected via an address/data bus 244. In some embodiments, the controller 228 may also include, or otherwise be communicatively connected to, a database 242 or other data storage mechanism (e.g., one or more hard disk drives, optical storage drives, solid state storage devices, etc.). The database 242 may include data such as customer questionnaires, if not implemented in the web server 202, etc. The database 242 may also include customer/consumer profile information for use in segmenting data, questions, categories, weighting by business and/or industry. It should be appreciated that although FIG. 4 depicts only one microprocessor 238, the controller 228 may include multiple microprocessors 238. Similarly, the memory 232 of the controller 228 may include multiple RAMs 234 and multiple program memories 236, 236A and 236B storing one or more corresponding server application modules, according to the controller's particular configuration. The data server 222 may also include specific routines to render the data into an image for display by a client computer (not depicted) or any of the web devices 210 via web server 202.

Although FIG. 4 depicts the I/O circuit 230 as a single block, the I/O circuit 230 may include a number of different types of I/O circuits (not depicted), including but not limited to, additional load balancing equipment, firewalls, etc. The RAM(s) 234, 240 and the program memories 236, 236A and 236B may be implemented in a known form of computer storage media, including but not limited to, semiconductor memories, magnetically readable memories, and/or optically readable memories, for example, but does not include transitory media such as carrier waves.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method of developing scores from customer experience data comprising:
   receiving, at a server, information related to:
   i) a customer's experience with a company, the information including data associated with the customer's perception of two or more experience categories, and
   ii) the customer's specific interactions with the company, the information including data associated with interactions between the consumer and the company for two or more interaction categories;
   using a first algorithm executed on the server to weight the customer experience data to develop an experience score for the company;
   using a second algorithm executed on the server to weight the customer specific interaction data to develop an interaction score for the company;
   using a third algorithm executed on the server to develop a composite score for the company; and
   rendering an image of at least one of the experience score, the interaction score, or the composite score for the company for presentation of the image via a computer.

2. The method of claim 1, wherein each of the experience categories corresponds to the customer's perception of price, responsiveness, reliability, brand, expertise, accuracy, availability, or a factor based on an unequally weighted combination of simple, caring, and personalized.

3. The method of claim 2, wherein using an algorithm executed on the server to unequally weight the customer experience data comprises:
   weighting the price data in a range of 0.15 to 0.25 (15%-25%);
   weighting the responsiveness data in a range of 0.10 to 0.20 (10%-20%);
   weighting the reliability data in a range of 0.10 to 0.20 (10%-20%);
   weighting the availability data in a range of 0.05 to 0.15 (5%-15%);
   weighting the brand data in a range of 0.05 to 0.15 (5%-15%);
   weighting the expertise in a range of 0.05 to 0.15 (5%-15%);
   weighting the accuracy in a range of 0.05 to 0.15 (5%-15%; and
   weighting the factor data in a range of 0.05 to 0.15 (5%-15%).

4. The method of claim 2, wherein unequally weighting the factor data comprises:
   weighting the simple-to-do-business-with data in a range of 0.4 to 0.6 (40%-60%);
   weighting the caring data in a range of 0.15 to 0.35 (15%-35%); and
   weighting the personalized data in a range of 0.15 to 0.35 (15%-35%).

5. The method of claim 1, wherein each of the interaction categories is associated with interactions selected from a purchase, a quote, a new policy, a policy change, a new bank account, a change to a bank account, a new loan, a change to a loan, a loan payment, a new credit card, a change to a credit card account, a credit card payment, a new mutual fund, a change to a mutual fund, a new money market, a change to a money market, a new retirement account, a change to a retirement account, billing and payment, a deposit, a withdrawal, a fraud report or claims activity.

6. The method of claim 1, wherein the first algorithm is executed on the server to unequally weight the customer experience data and the second algorithm executed on the server is executed to equally weight the customer specific interaction data.

7. The method of claim 1, wherein the composite score is an average of the experience score and the interaction score.

8. The method of claim 1, further comprising:
   receiving, at the server, information comprising experience data related to a plurality of customers' experiences with a second company, wherein the experience data are weighted and combined to develop an experience score for the second company.

9. The method of claim 8, further comprising:
   receiving, at the server, information comprising interaction data related to a plurality of customers' specific customer interactions with the second company; and
   weighting and combining the specific customer interaction data to develop a specific customer interactions score for the second company.

10. The method of claim 9, further comprising:
    combining the experiences score for the second company and the specific customer interactions score for the second company to develop a composite score for the second company;
    rendering a second image of the experience score, the interaction score, and the composite score for the second company; and
    displaying the second image rendered for the second company concurrently with the image rendered for the company.

11. The method of claim 10, further comprising:
    developing experiences scores, specific interaction scores, and composite scores for a plurality of companies;
    combining respective experiences scores, specific interaction scores, and composite scores for all of the plurality of companies to create an industry experiences score, an industry specific interaction scores, and an industry composite score; and
    rendering the industry experiences score, the industry specific interaction scores, and the industry composite score for presentation with the experiences scores, specific interaction scores, and composite scores for each of the plurality of companies or a selected portion of the plurality of companies.

12. A computer-readable storage media storing computer executable instructions that when executed by one or more processors, cause the one or more processors to:
    receive survey data related to a plurality of customers' observations about a plurality of companies;
    identify the survey data by company, and for each of the plurality of companies to:
        develop an experience value based on survey data related to customer experience with the company;
        develop an interaction value based on survey data related to specific customer interactions with the company; and
        mathematically combine the experience value and the interaction value to develop a composite score;

after the survey data is identified by company and processed, render an image showing by company at least one of the experience value, the interaction value, or the composite value for each company represented in the data; and displaying the image on a computer display.

13. The computer-readable storage media of claim 12, wherein the plurality of companies includes at least one of insurance, financial or banking industry companies.

14. The computer-readable storage media of claim 12, wherein to develop an experience value based on survey data related to customer experience with the company the computer executable instructions cause the one or more processors to:

divide the data into experience data and customer interaction data;

segregate the experience data into experience categories;

average the values in each experience category; and weight and combine the average values in each of the experience categories to develop an experience value.

15. The computer-readable storage media of claim 14, wherein the experience categories comprise at least one of price, responsiveness, reliability, brand, expertise, accuracy, availability, or a factor based on an unequally weighted combination of simple, caring, and personalized.

16. The computer-readable storage media of claim 12, wherein to develop an interaction value based on survey data related to specific customer interactions with the company the computer executable instructions cause the one or more processors to:

divide the data into experience data and customer interaction data;

segregate the customer interaction data into interaction categories;

average the values in each interaction category; and weight and combine the average values in each of the interaction categories to develop an interaction value.

17. The computer-readable storage media of claim 16, wherein the interaction categories comprise equally weighted categories including two or more selected from: a purchase interaction, a quote interaction, a new policy interaction, a policy change interaction, a new bank account interaction, a change to a bank account interaction, a new loan interaction, a change to a loan interaction, a loan payment interaction, a new credit card interaction, a change to a credit card account interaction, a credit card payment interaction, a new mutual fund interaction, a change to a mutual fund interaction, a new money market interaction, a change to a money market interaction, a new retirement account interaction, a change to a retirement account interaction, billing and payment interaction, a deposit interaction, a withdrawal interaction, a fraud report interaction or claims activity interaction.

18. The computer-readable storage media of claim 17, further comprising instructions that cause the processor to weight each of the interaction categories equally.

19. A system for evaluating customer experience data comprising:

a server having a processor, a network interface for sending and receiving data via a network, and a computer storage media coupled to the processor that stores computer executable instructions;

a plurality of computing devices coupled to the server via the network, wherein the computer executable instructions when executed by the processor cause the server to:

receive data from one or more of the plurality of computing devices corresponding to a plurality of customer responses to a set of questions related to customer experiences with respective companies;

associate each response with a category of interest from a set of categories of interest;

group the answers by company;

separate each answer by company into its respective question's category of interest;

calculate, for each category of interest by company, a value based on answers in that category;

weight and combine the value of each category to create a score for each company;

calculate an average of all scores to form an industry average score;

display the score for each company; and display the industry average score.

20. The system of claim 19, wherein each response is assigned a point value and wherein the value of each category is a sum of the point values of all answers in that category.

21. The system of claim 19, further comprising:

create an experience subscore for each company using responses related to an impression of the company with respect price, reliability, and brand; and create an interaction subscore for each company including responses related to an impression of the company with respect to a purchase, a quote, and billing and payment;

display the experience subscore and the interaction subscore with its respective company score.

* * * * *